US007304644B2

(12) United States Patent
Geiger (10) Patent No.: US 7,304,644 B2
(45) Date of Patent: Dec. 4, 2007

(54) SYSTEM AND METHOD FOR PERFORMING A VIRTUAL ENDOSCOPY

(75) Inventor: Bernhard Geiger, Cranbury, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 669 days.

(21) Appl. No.: 10/795,918

(22) Filed: Mar. 8, 2004

(65) Prior Publication Data
US 2004/0202990 A1  Oct. 14, 2004

Related U.S. Application Data

(60) Provisional application No. 60/454,105, filed on Mar. 12, 2003.

(51) Int. Cl.
*G06T 17/00* (2006.01)
*G06K 9/00* (2006.01)

(52) U.S. Cl. ............. 345/424; 382/131; 382/132; 382/154

(58) Field of Classification Search .......... 345/424
See application file for complete search history.

(56) References Cited

U.S. PATENT DOCUMENTS

| 4,945,478 | A | * | 7/1990 | Merickel et al. ............ 382/131 |
| 5,734,384 | A |   | 3/1998 | Yanof et al. |
| 5,782,762 | A | * | 7/1998 | Vining ......................... 600/407 |
| 5,891,030 | A | * | 4/1999 | Johnson et al. ............. 600/407 |
| 5,920,319 | A | * | 7/1999 | Vining et al. ............... 345/420 |
| 6,346,940 | B1 * | 2/2002 | Fukunaga .................... 345/427 |
| 6,366,800 | B1 * | 4/2002 | Vining et al. ............... 600/425 |
| 6,556,696 | B1 * | 4/2003 | Summers et al. ........... 382/128 |
| 6,574,304 | B1 * | 6/2003 | Hsieh et al. .................. 378/62 |
| 6,591,130 | B2 * | 7/2003 | Shahidi ....................... 600/424 |
| 7,062,083 | B2 * | 6/2006 | Lim et al. .................... 382/164 |
| 7,123,766 | B2 * | 10/2006 | Mao et al. .................. 382/154 |
| 7,260,250 | B2 * | 8/2007 | Summers et al. ........... 382/128 |
| 2001/0031920 | A1 * | 10/2001 | Kaufman et al. ........... 600/431 |
| 2002/0006216 | A1 * | 1/2002 | Armato et al. .............. 382/131 |

(Continued)

OTHER PUBLICATIONS

Wyatt, C. L. et al., Automatic Segmentation of the colon for virtual colonoscopy, *Computerized Medical Imaging and Graphics: XP-000925199* 2000, Elsevier Science Ltd.

(Continued)

*Primary Examiner*—Mark Zimmerman
*Assistant Examiner*—Crystal Murdoch
(74) *Attorney, Agent, or Firm*—Donald B. Paschburg; F. Chau & Associates, LLC (57) ABSTRACT

A system and method for performing a virtual endoscopy is provided. The method comprises the steps of: calculating a distance map using three-dimensional (3D) data of a lumen; calculating a multiplanar reconstruction (MPR) of the lumen, wherein the MPR is calculated orthogonal to the lumen at an endoscope position; performing a first region growing on the MPR of the lumen at the endoscope position, wherein data associated with the first region is marked; calculating a minimum distance and a maximum distance from the marked data of the first region growing using corresponding distances from the distance map; performing a second region growing on the MPR of the lumen for data outside the first region growing, wherein data associated with the second region is marked; and performing a 3D rendering of the marked data associated with the first region growing and the second region growing.

26 Claims, 5 Drawing Sheets

U.S. PATENT DOCUMENTS

| | | | |
|---|---|---|---|
| 2002/0009215 A1* | 1/2002 | Armato et al. | 382/131 |
| 2002/0122587 A1* | 9/2002 | Lim et al. | 382/165 |
| 2002/0172407 A1* | 11/2002 | O'Donnell et al. | 382/131 |
| 2002/0193687 A1* | 12/2002 | Vining et al. | 600/425 |
| 2003/0095696 A1* | 5/2003 | Reeves et al. | 382/131 |
| 2003/0095697 A1* | 5/2003 | Wood et al. | 382/131 |
| 2003/0099386 A1* | 5/2003 | Schneider et al. | 382/130 |
| 2003/0152262 A1* | 8/2003 | Mao et al. | 382/154 |
| 2004/0086175 A1* | 5/2004 | Parker et al. | 382/154 |
| 2004/0101183 A1* | 5/2004 | Mullick et al. | 382/131 |
| 2004/0184655 A1* | 9/2004 | Ziegler et al. | 382/154 |
| 2004/0227756 A1* | 11/2004 | Dicken | 345/424 |
| 2004/0252870 A1* | 12/2004 | Reeves et al. | 382/128 |
| 2005/0036679 A1* | 2/2005 | Wiemker et al. | 382/173 |
| 2005/0213800 A1* | 9/2005 | Chen et al. | 382/128 |
| 2005/0228250 A1* | 10/2005 | Bitter et al. | 600/407 |
| 2005/0254697 A1* | 11/2005 | Zhang et al. | 382/131 |
| 2007/0003124 A1* | 1/2007 | Wood et al. | 382/131 |
| 2007/0003131 A1* | 1/2007 | Kaufman | 382/154 |

OTHER PUBLICATIONS

International Search Report Dec. 7, 2004.

\* cited by examiner

SYSTEM AND METHOD FOR PERFORMING A VIRTUAL ENDOSCOPY

CROSS-REFERENCE TO RELATED APPLICATIONS

This application claims the benefit of U.S. Provisional Application No. 60/454,105, filed Mar. 12, 2003, a copy of which is herein incorporated by reference.

BACKGROUND OF THE INVENTION

1. Technical Field

The present invention relates to performing a virtual endoscopy and, more particularly, to performing a virtual endoscopy using multiplanar reconstruction (MPR) and three-dimensional (3D) renderings of a virtual endoscopic image.

2. Discussion of the Related Art

Virtual endoscopy (or computed endoscopy) is a method of diagnosis using computer processing of three-dimensional (3D) image datasets such as, computerized tomography (CT) or magnetic resonance imaging (MRI) scans, to provide simulated visualizations of patient specific organs similar to those produced by standard invasive endoscopic procedures. Virtual endoscopy has been applied to many endoscopic procedures including bronchoscopy, colonoscopy, pancreatoscopy, laryngoscopy, and otoscopy. By utilizing virtual endoscopy, patient specific anatomic structures can be obtained noninvasively, thereby reducing procedural difficulties associated with performing standard invasive endoscopic procedures.

In a typical virtual endoscopic procedure, 3D images are created to simulate images coming from, for example, a fiber optic endoscope. Thus, one can fly through, for example, a lumen such as a colon, and observe the inner surface of the colon in order to detect surface abnormalities. This is accomplished by selecting a viewpoint of a virtual endoscope using a perspective projection, which is typically at a wide angle such as 110 degrees.

Although, the resulting images are useful to view the inner surface of the lumen, information on the outer surface of the lumen is typically not visible. Thus, it is difficult to determine the wall thickness of the lumen or abnormalities that may exist on the outer surface of the lumen. In addition, by utilizing a wide-angle perspective projection (e.g., 100 or 110 degrees), features such as tumors that may be hidden behind folds and curves in the lumen are not observed.

SUMMARY OF THE INVENTION

The present invention overcomes the foregoing and other problems encountered in the known teachings by providing a system and method for performing a virtual endoscopy.

In one embodiment of the present invention, a method for performing a virtual endoscopy comprises the steps of: calculating a distance map using three-dimensional (3D) data of a lumen; calculating a multiplanar reconstruction (MPR) of the lumen; performing a region growing on the MPR of the lumen; marking data from the region growing; and performing a 3D rendering of the marked data from the region growing.

In another embodiment of the present invention, a method for performing a virtual endoscopy comprises the steps of: calculating a distance map using 3D data of a lumen; calculating an MPR of the lumen, wherein the MPR is calculated orthogonal to the lumen at an endoscope position; performing a first region growing on the MPR of the lumen at the endoscope position; calculating a minimum distance and a maximum distance from data of the first region growing using corresponding distances from the distance map; performing a second region growing on the MPR of the lumen for data outside the first region growing; and performing a 3D rendering of data associated with the first region growing and the second region growing.

In yet another embodiment of the present invention, a system for performing a virtual endoscopy comprises: a memory device for storing a program; a processor in communication with the memory device, the processor operative with the program to: calculate a distance map using 3D data of a lumen; calculate an MPR of the lumen, wherein the MPR is calculated orthogonal to the lumen at an endoscope position; perform a first region growing on the MPR of the lumen at the endoscope position; calculate a minimum distance and a maximum distance from data of the first region growing using corresponding distances from the distance map; perform a second region growing on the MPR of the lumen for data outside the first region growing; and perform a 3D rendering of data associated with the first region growing and the second region growing.

In another embodiment of the present invention, a computer program product comprising a computer useable medium having computer program logic recorded thereon for performing a virtual endoscopy, the computer program logic comprises: program code for calculating a distance map using 3D data of a lumen; program code for calculating an MPR of the lumen, wherein the MPR is calculated orthogonal to the lumen at an endoscope position; program code for performing a first region growing on the MPR of the lumen at the endoscope position; program code for calculating a minimum distance and a maximum distance from data of the first region growing using corresponding distances from the distance map; program code for performing a second region growing on the MPR of the lumen for data outside the first region growing; and program code for performing a 3D rendering of data associated with the first region growing and the second region growing.

In yet another embodiment of the present invention, a system for performing a virtual endoscopy comprises: means for calculating a distance map using 3D data of a lumen; means for calculating an MPR of the lumen, wherein the MPR is calculated orthogonal to the lumen at an endoscope position; means for performing a first region growing on the MPR of the lumen at the endoscope position; means for calculating a minimum distance and a maximum distance from data of the first region growing using corresponding distances from the distance map; means for performing a second region growing on the MPR of the lumen for data outside the first region growing; and means for performing a 3D rendering of data associated with the first region growing and the second region growing.

In another embodiment of the present invention, a method for performing a virtual endoscopy comprises the steps of: acquiring 3D data from a lumen; calculating a distance map using the 3D data of the lumen; positioning an endoscope at a desired position in the lumen; calculating an MPR of the lumen, wherein the MPR is calculated orthogonal to the lumen at the endoscope position; performing a first region growing on the MPR of the lumen at the endoscope position; marking data associated with the first region growing for rendering; calculating a minimum distance and a maximum distance from the marked data of the first region growing using corresponding distances from the distance map; performing a plurality of region growings for data outside the marked data region that is within a threshold associated with the calculation of the minimum and maximum distances; marking data associated with the plurality of region growings for rendering; and performing a 3D rendering of the marked regions associated with the first growing and the plurality of region growings.

The foregoing advantages and features are of representative embodiments and are presented to assist in understanding the invention. It should be understood that they are not intended to be considered limitations on the invention as defined by the claims, or limitations on equivalents to the claims. Therefore, this summary of features and advantages should not be considered dispositive in determining equivalents. Additional features and advantages of the invention will become apparent in the following description, from the drawings and from the claims.

DETAILED DESCRIPTION OF EXEMPLARY EMBODIMENTS

Figure 1:
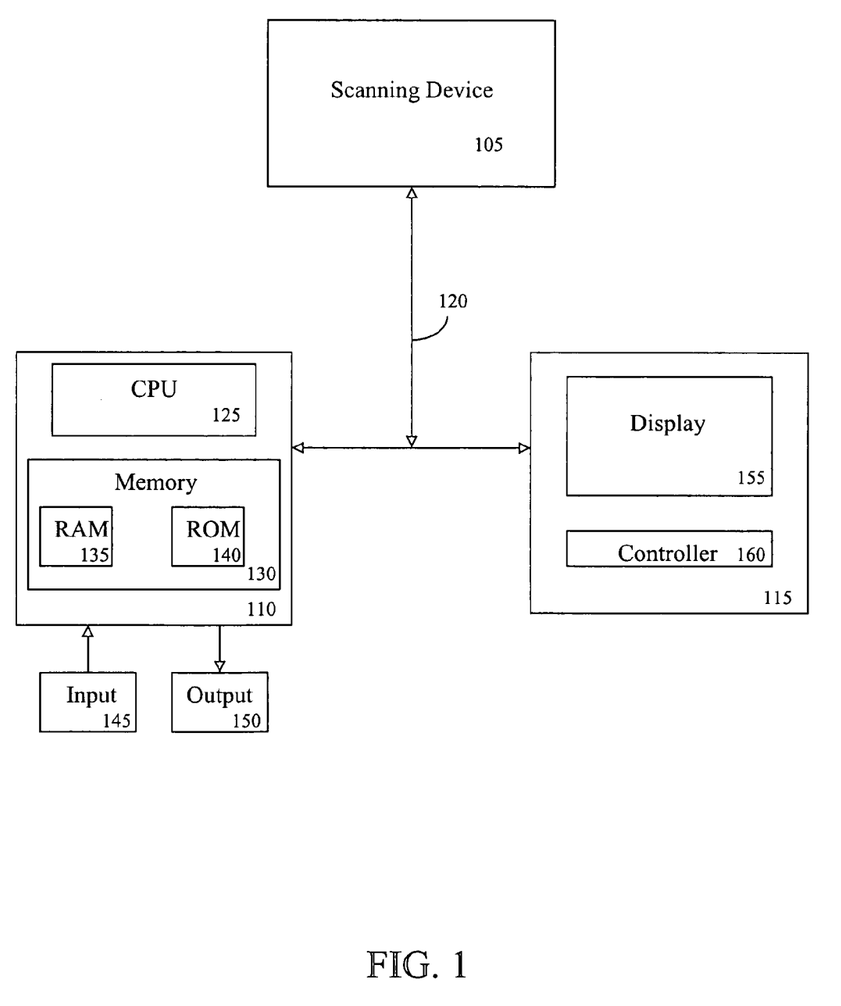
FIG. 1 is a block diagram of a system for performing a virtual endoscopy according to an exemplary embodiment of the present invention.

FIG. 1 is a block diagram of a system 100 for performing a virtual endoscopy according to an exemplary embodiment of the present invention. As shown in FIG. 1, the system 100 includes, inter alia, a scanning device 105, a personal computer (PC) 110 and an operator's console 115 connected over, for example, an Ethernet network 120. The scanning device 105 may be a magnetic resonance imaging (MRI) device, a computed tomography (CT) imaging device, a helical CT device, a positron emission tomography (PET) device, a two-dimensional (2D) or three-dimensional (3D) fluoroscopic imaging device, a 2D, 3D, or four-dimensional (4D) ultrasound imaging device, or an x-ray device, etc.

The PC 110, which may be a portable or laptop computer, a personal digital assistant (PDA), etc., includes a central processing unit (CPU) 125 and a memory 130, which are connected to an input 145 and an output 150. The memory 130 includes a random access memory (RAM) 135 and a read only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 145 is constituted by a keyboard, mouse, etc., and the output 150 is constituted by a liquid crystal display (LCD), cathode ray tube (CRT) display, printer, etc.

The operation of the system 100 is controlled from the operator's console 115, which includes a controller 160, for example, a keyboard, and a display 155, for example, a CRT display. The operator's console 115 communicates with the PC 110 and the scanning device 105 so that 2D image data collected by the scanning device 105 can be rendered into 3D data by the PC 110 and viewed on the display 155. It is to be understood that the PC 110 can operate and display information provided by the scanning device 105 absent the operator's console 115.

Figure 2:
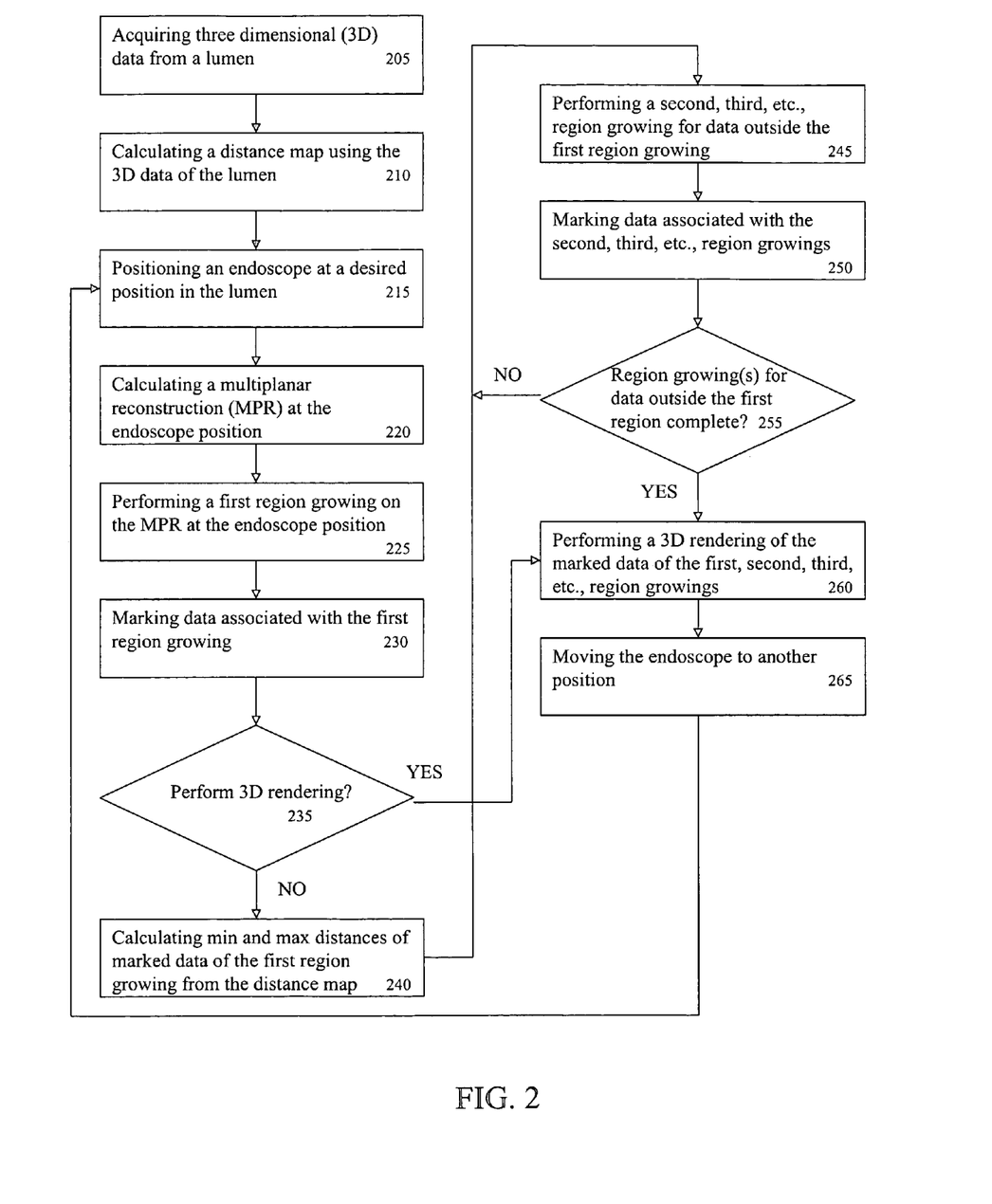
FIG. 2 is a flowchart showing an operation of a method for performing a virtual endoscopy according to an exemplary embodiment of the present invention.

FIG. 2 is a flowchart showing an operation of a method for performing a virtual endoscopy according to an exemplary embodiment of the present invention. As shown in FIG. 2, 3D data is acquired from a lumen (step 205). This is accomplished by using the scanning device 105, in this example a CT scanner, which is operated at the operator's console 115, to scan a selected lumen thereby generating a series of 2D images associated with the lumen. The 2D images of the lumen are then converted or transformed into a 3D rendered image. It is to be understood that the lumen can be any one of a colon, a pancreas, a bronchi, a larynx, a trachea, a sinus, an ear canal, a blood vessel, a urethra and a bladder or any other inner open space or cavity of a tubular organ.

After the 3D data is acquired from the lumen, a distance map is calculated using the 3D data from the lumen (step 210). The distance map is calculated by assigning a first voxel (e.g., seed voxel) of the lumen an initial distance value of "1". The voxels adjacent to the first voxel are examined and if they belong to the lumen and have not been previously assigned a distance value, they are assigned a distance value of "2". Subsequently, the voxels adjacent to the voxels assigned a distance value of "2" are assigned a distance value of "3" if they belong to the lumen and have not been previously assigned a distance value. This process is repeated until all of the voxels in the lumen have been assigned distance values. Thus, during the calculation of the distance map, a neighbor (e.g., an adjacent voxel) of a voxel that has a distance value "n" will be assigned a distance value of "n+1" if it belongs to the lumen and has not been assigned a distance value.

As further shown in FIG. 2, an endoscope (e.g., a virtual endoscope) is positioned at a desired location in the lumen (step 215). This is accomplished by a user clicking on a screen location associated with an area of the lumen that analysis of is desired or by conducting a flythrough of the lumen via a pre-programmed "flight path" to find a desired location for study. After step 215, a multiplanar reconstruction (MPR) orthogonal to the lumen at the endoscope position is calculated (step 220). Using the MPR image of the lumen, a region growing is then performed at the endoscope position (step 225). Similar to the process of calculating a distance map in step 210, in the region growing, a seed voxel is selected at for example, the center of the endoscope position and it is assigned a first value. Its neighboring voxels are then read and the neighboring voxels are compared to a threshold range, which may be determined by marking a region of interest in the lumen, to determine if such neighboring voxels (e.g., adjacent voxels) fall within the threshold range. If the voxel or voxels are within the threshold range it/they are assigned a second value and the process is repeated until all voxels in the region of interest have been tested and/or assigned values.

The data associated with the region growing is then marked as a candidate for 3D rendering (step 230). This data is marked by assigning it an identifier, which may be for example, a value different than all other pixel or voxel values in the MPR. At this point, a user can proceed to perform a 3D rendering of the marked data in step 260 or continue to modify the MPR image in step 240 (step 235).

If the user goes to step 260, the MPR data is combined with a 3D rendering of the marked data to provide an enhanced image of the lumen. In other words, the marked pixels or voxels in the MPR are replaced by a 3D rendering of the lumen.

Figure 3:
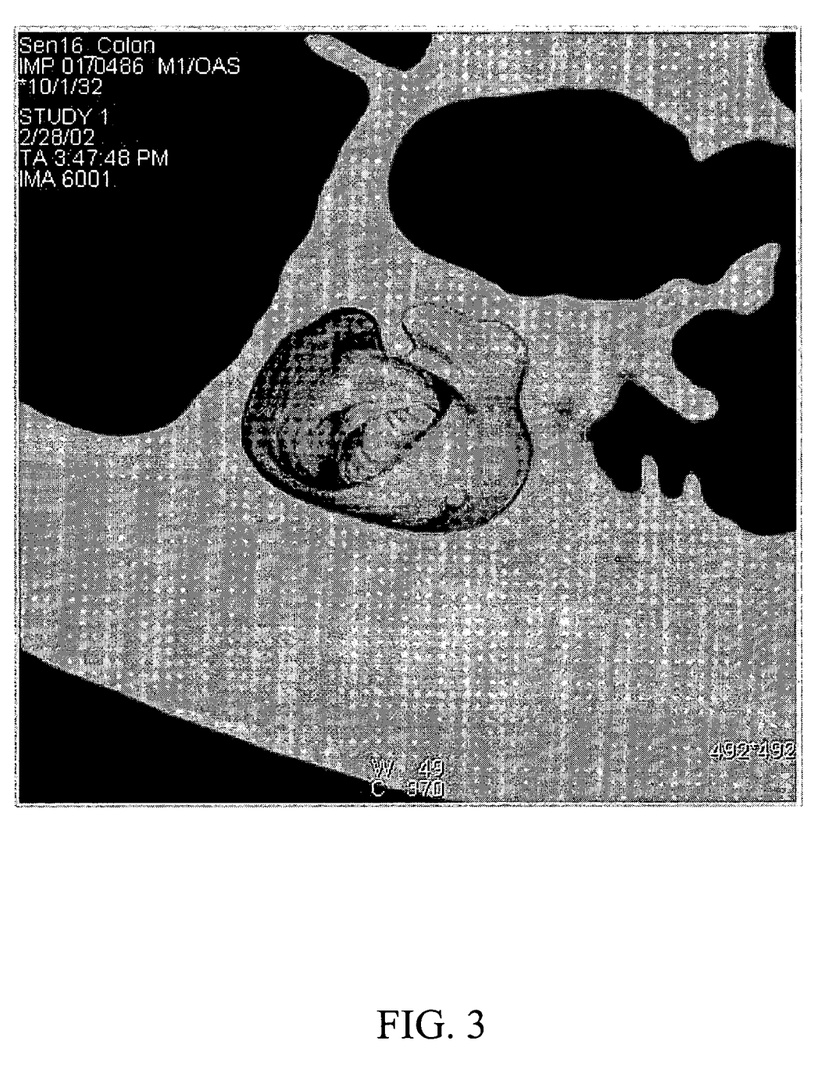
FIG. 3 is a three-dimensional (3D) rendering of a lumen according to an exemplary embodiment of the present invention.

An exemplary image 300 resulting from directly proceeding from step 235 to step 260 is shown in FIG. 3. As shown in FIG. 3, information outside the lumen (in this example the lumen is a colon) can be observed. In particular, information outside the wall of the colon is visible and, by using this information, the thickness of the colon's wall can be determined and abnormalities such as a polyp can be observed. In addition, the surrounding MPR image sections are not rendered (e.g., not clear images of the colon) because they were not marked for rendering. Thus, the image 300 displays only the desired portion of the lumen selected earlier by the user in step 215. It is to be understood that the option of directly proceeding from step 235 to step 260, allows the user to quickly deal with portions of a lumen that do not have problems such as curves or, for example, Haustral folds. It is to be further understood, however, that step 235 can be removed and the sequence in FIG. 2 would proceed directly to step 240.

If, however, the user desires to further modify or enhance the MPR image, minimum and maximum distances of the marked data of the first region growing from the distance map are calculated (step 240). This is accomplished by looking up the distance values of all the marked data (e.g., marked pixels or voxels) and tabulating their minimum and maximum distances from their corresponding locations on the distance map of step 210. Once the distance values have been calculated, additional region growings can be performed for data outside the first marked region that is believed to be part of the desired lumen. An example of data that is outside a marked region is illustrated in image 400 of FIG. 4.

Figure 4:
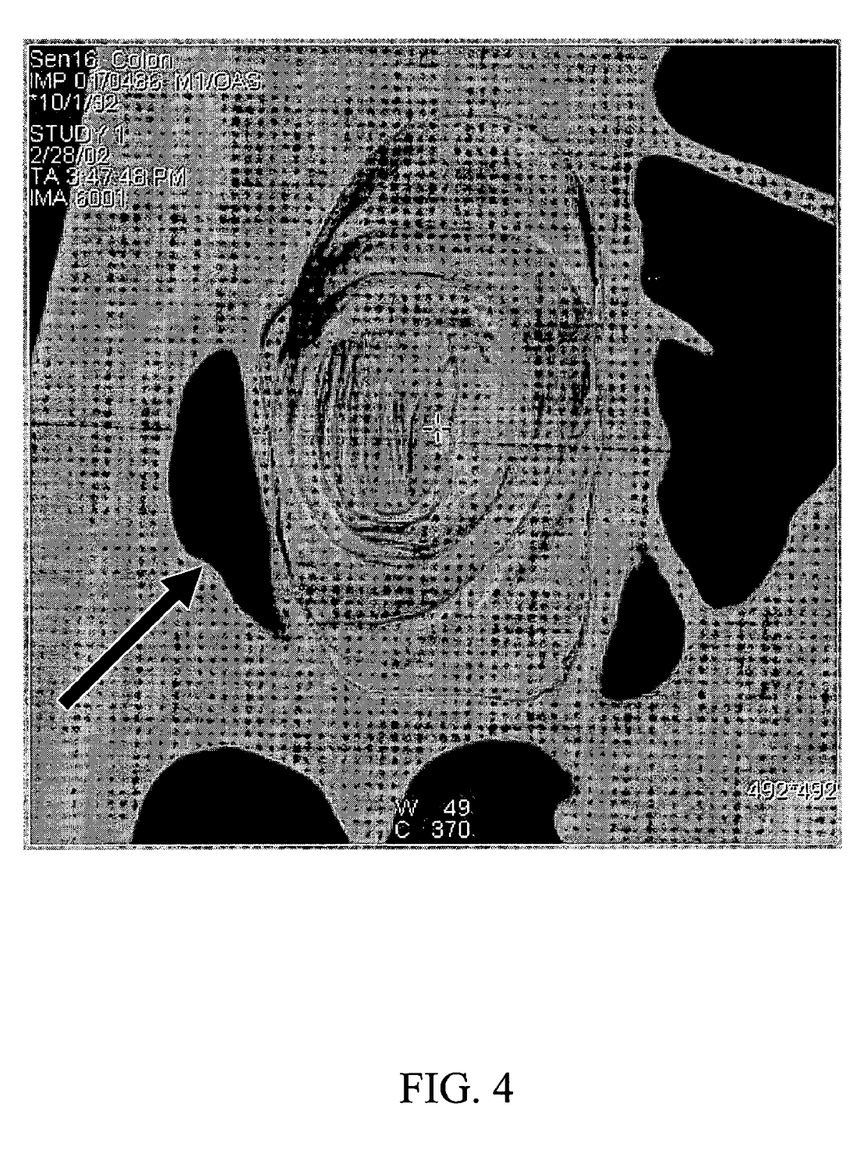
FIG. 4 is a lumen that was rendered in 3D that includes a portion that was not rendered in 3D.

As shown in FIG. 4, the image 400 includes a portion of a lumen that was not subject to 3D rendering (again, in this example the lumen is a colon). An arrow indicates this portion (i.e., a portion of the lumen that was not marked after the first region growing). In order to render the portion indicated by the arrow, another region growing is performed for data outside the first region growing (step 245). This is accomplished by examining all of the pixels or voxels of the MPR that belong to the lumen that were not marked after the first region growing. If such pixels or voxels are found, and they are within a close proximity to the calculated minimum and maximum distances of the marked data from the first region growing, they will be used as a seed for subsequent region growings (e.g., second, third, etc., region growings). Following this, the data associated with the region growing is marked as a candidate for 3D rendering and assigned an identifier (step 250). This sequence (steps 245-255) will repeat itself until all region growings based on the distance of the seed pixel to the first region growing have been completed (step 255).

It is to be understood that just a single region growing could take place in this sequence (steps 245-255) and that a user could have the option to proceed directly to step 260 after the single region growing. In other words, only a second region growing will be performed during this sequence, not third, fourth, etc., region growings.

It should also be understood, that a threshold based on the calculated maximum and minimum distances (from step 240) could be set to limit the area in which the second or subsequent region growings are to be performed. For example, the threshold can simply be set to the calculated minimum and maximum distances (therefore the second region growing can not extend beyond these points), it can be set to half the calculated minimum and maximum distances or it can be set to a limit beyond the calculated maximum and minimum distances.

Figure 5:
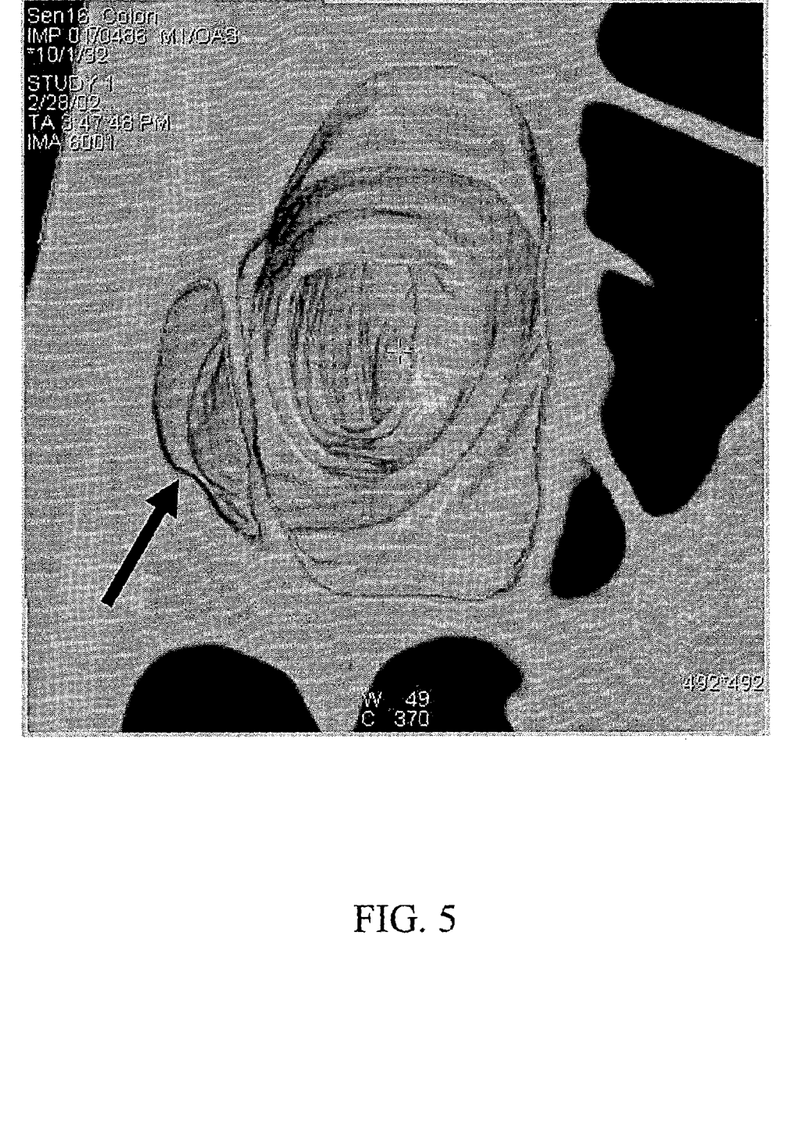
FIG. 5 is the portion of the lumen of FIG. 4 that was not rendered in 3D, rendered in 3D, according to an exemplary embodiment of the present invention.

In step 260, a 3D rendering is performed on the marked data of the first, second, third, etc., region growings using a 3D rendering technique such as raycasting, surface rendering (e.g., shaded surface rendering), volume rendering, etc. It is to be understood that the 3D rendering can be performing using the CPU 125 of FIG. 1 or by dedicated rendering hardware such as a graphics card, volume rendering card, etc. The resulting 3D rendering of the marked MPR image is illustrated in image 500 of FIG. 5. As shown by the image 500, the portion of the lumen of FIG. 4 that is indicated by the arrow is now visible. Accordingly, information outside the wall of the colon is visible and information such as the thickness of the colon's wall can be determined and abnormalities such as a polyp can be observed. After performing the 3D rendering in step 260, a user can move the endoscope to another position in the lumen and repeat the process described above (step 265).

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for performing a virtual endoscopy, comprising:
   calculating a multiplanar reconstruction (MPR) of a lumen;

performing a two-dimensional (2D) region growing in a portion of the lumen on the MPR;

marking data in the portion of the lumen during the 2D region growing as a candidate for three-dimensional (3D) rendering;

performing a 3D rendering on the portion of the lumen within the marked data;

replacing the marked data with the 3D rendered portion of the lumen; and displaying an image of the MPR with the 3D rendered portion of the lumen in an area that originally included the marked data.

2. The method of claim 1, further comprising:
acquiring image data from the lumen.

3. The method of claim 2, wherein the image data is acquired by one of computed tomographic (CT), helical CT, x-ray, positron emission tomographic, fluoroscopic, ultrasound, and magnetic resonance (MR) imaging techniques.

4. The method of claim 1, wherein the lumen is one of a colon, a pancreas, a bronchi, a larynx, a trachea, a sinus, an ear canal, a blood vessel, a urethra and a bladder.

5. The method of claim 1, wherein the MPR is calculated orthogonal to the lumen.

6. The method of claim 1, wherein the MPR is calculated at an endoscope position.

7. The method of claim 1, wherein the 2D region growing is performed at the endoscope position.

8. The method of claim 1, wherein the 3D rendering is performed using one of raycasting, surface rendering and volume rendering techniques.

9. A method for performing a virtual endoscopy, comprising:

calculating a distance map using three-dimensional (3D) data of a lumen;

calculating a multiplanar reconstruction (MPR) of the lumen, wherein the MPR is calculated orthogonal to the lumen at an endoscope position;

performing a first two-dimensional (2D) region growing in a desired portion of the lumen on the MPR at the endoscope position;

marking first data in the desired portion of the lumen during the first 2D region growing as a candidate for 3D rendering;

calculating a minimum distance and a maximum distance to the endoscope position in the desired portion of the lumen within the first marked data by using the distance map to identify a part of the desired portion of the lumen that was not included in the first 2D region growing;

performing a second 2D region growing in the part of the desired portion on the MPR;

marking second data in the part of the desired portion during the second 2D region growing as another candidate for 3D rendering;

performing a 3D rendering on the desired portion of the lumen within the first marked data and the part of the desired portion within the second marked data;

replacing the first marked data with the 3D rendered desired portion of the lumen and the second marked data with the 3D rendered part of the desired portion; and displaying an image of the MPR with the 3D rendered desired portion of the lumen in an area that originally included the first marked data and the 3D rendered part of the desired portion in an area that originally included the second marked data.

10. The method of claim 9, further comprising: acquiring the 3D data from the lumen.

11. The method of claim 10, wherein the 3D data is acquired by one of computed tomographic (CT), helical CT, x-ray, positron emission tomographic, fluoroscopic, ultrasound, and magnetic resonance (MR) imaging techniques.

12. The method of claim 9, wherein the lumen is one of a colon, a pancreas, a bronchi, a larynx, a trachea, a sinus, an ear canal, a blood vessel, a urethra and a bladder.

13. The method of claim 9, wherein the 3D rendering is performed using one of raycasting, surface rendering and volume rendering techniques.

14. The method of claim 9, wherein the second 2D region growing is performed within a threshold associated with the calculated minimum and maximum distances.

15. A system for performing a virtual endoscopy, comprising:

a memory device for storing a program;

a processor in communication with the memory device, the processor operative with the program to:

calculate a distance map using three-dimensional (3D) data of a lumen;

calculate a multiplanar reconstruction (MPR) of the lumen, wherein the MPR is calculated orthogonal to the lumen at an endoscope position;

perform a first two-dimensional (2D) region growing in a desired portion of the lumen on the MPR at the endoscope position;

mark first data in the desired portion of the lumen during the first 2D region growing as a candidate for 3D rendering;

calculate a minimum distance and a maximum distance to the endoscope position in the desired portion of the lumen within the first marked data by using the distance map to identify a part of the desired portion of the lumen that was not included in the first 2D region growing;

perform a second 2D region growing in the part of the desired portion on the MPR;

mark second data in the part of the desired portion during the second 2D region growing as another candidate for 3D rendering;

perform a 3D rendering on the desired portion of the lumen within the first marked data and the part of the desired portion within the second marked data;

replace the first marked data with the 3D rendered desired portion of the lumen and the second marked data with the 3D rendered part of the desired portion; and display an image of the MPR with the 3D rendered desired portion of the lumen in an area that originally included the first marked data and the 3D rendered part of the desired portion in an area that originally included the second marked data.

16. The system of claim 15, wherein the processor is further operative with the program code to:
acquire the 3D data of the lumen.

17. The system of claim 16, wherein the 3D data is acquired by a scanning device using one of computed tomographic (CT), helical CT, x-ray, positron emission tomographic, fluoroscopic, ultrasound, and magnetic resonance (MR) imaging techniques.

18. The system of claim 15, wherein the image is displayed by a display device.

19. A computer program product comprising a computer useable medium having computer program logic recorded thereon for performing a virtual endoscopy, the computer program logic comprising:

program code for calculating a distance map using three-dimensional (3D) data of a lumen;

program code for calculating a multiplanar reconstruction (MPR) of the lumen, wherein the MPR is calculated orthogonal to the lumen at an endoscope position;

program code for performing a first two-dimensional (2D) region growing in a desired portion of the lumen on the MPR at the endoscope position;

program code for marking first data in the desired portion of the lumen during the first 2D region growing as a candidate for 3D rendering;

program code for calculating a minimum distance and a maximum distance to the endoscope position in the desired portion of the lumen within the first marked data by using the distance map to identify a part of the desired portion of the lumen that was not included in the first 2D region growing;

program code for performing a second 2D region growing in the part of the desired portion on the MPR;

program code for marking second data in the part of the desired portion during the second 2D region growing as another candidate for 3D rendering;

program code for performing a 3D rendering on the desired portion of the lumen within the first marked data and the part of the desired portion within the second marked data;

program code for replacing the first marked data with the 3D rendered desired portion of the lumen and the second marked data with the 3D rendered part of the desired portion; and program code for displaying an image of the MPR with the 3D rendered desired portion of the lumen in an area that originally included the first marked data and the 3D rendered part of the desired portion in an area that originally included the second marked data.

20. The computer program product of claim 19, wherein the computer program logic further comprises:

program code for acquiring the 3D data from the lumen.

21. The computer program product of claim 20, wherein the 3D data is acquired by one of computed tomographic (CT), helical CT, x-ray, positron emission tomographic, fluoroscopic, ultrasound, and magnetic resonance (MR) imaging techniques.

22. The computer program product of claim 19, wherein the lumen is one of a colon, a pancreas, a bronchi, a larynx, a trachea, a sinus, an ear canal, a blood vessel, a urethra and a bladder.

23. The computer program product of claim 19, wherein the 3D rendering is performed using one of raycasting, surface rendering and volume rendering techniques.

24. A system for performing a virtual endoscopy, comprising:

means for calculating a distance map using three-dimensional (3D) data of a lumen;

means for calculating a multiplanar reconstruction (MPR) of the lumen, wherein the MPR is calculated orthogonal to the lumen at an endoscope position;

means for performing a first two-dimensional (2D) region growing in a desired portion of the lumen on the MPR at the endoscope position;

means for marking first data in the desired portion of the lumen during the first 2D region growing as a candidate for 3D rendering;

means for calculating a minimum distance and a maximum distance to the endoscope position in the desired portion of the lumen within the first marked data by using the distance map to identify a part of the desired portion of the lumen that was not included in the first 2D region growing;

means for performing a second 2D region growing in the part of the desired portion on the MPR;

means for marking second data in the part of the desired portion during the second 2D region growing as another candidate for 3D rendering;

means for performing a 3D rendering on the desired portion of the lumen within the first marked data and the part of the desired portion within the second marked data;

means for replacing the first marked data with the 3D rendered desired portion of the lumen and the second marked data with the 3D rendered part of the desired portion; and means for displaying an image of the MPR with the 3D rendered desired portion of the lumen in an area that originally included the first marked data and the 3D rendered part of the desired portion in an area that originally included the second marked data.

25. A method for performing a virtual endoscopy, comprising:

acquiring three-dimensional (3D) data from a lumen;

calculating a distance map using the 3D data of the lumen;

positioning an endoscope in the lumen;

calculating a multiplanar reconstruction (MPR) of the lumen, wherein the MPR is calculated orthogonal to the lumen at the endoscope position;

performing a two-dimensional (2D) region growing in a desired portion of the lumen on the MPR at the endoscope position;

marking data in the desired portion of the lumen during the 2D region growing as a candidate for 3D rendering;

calculating a minimum distance and a maximum distance to the endoscope position in the desired portion of the lumen within the marked data by using the distance map to identify parts of the desired portion of the lumen that were not included in the 2D region growing;

performing a 2D region growing in each of the parts of the desired portion on the MPR;

marking data in each of the parts of the desired portion as a candidate for 3D rendering;

performing a 3D rendering on the desired portion of the lumen within its corresponding marked data and each of the parts of the desired portion within each part's corresponding marked data;

replacing the marked data corresponding to the desired portion of the lumen with the 3D rendered desired portion of the lumen and the marked data corresponding to each of the parts of the desired portion with the 3D rendered parts of the desired portion; and displaying an image of the MPR with the 3D rendered desired portion of the lumen in an area that originally included its corresponding marked data and the 3D rendered parts of the desired portion in areas that originally included each part's corresponding marked data.

26. The method of claim 25, wherein the parts of the desired portion of the lumen that were not included in the 2D region growing are identified by data that is outside the marked data in the desired portion of the lumen and that is within a threshold associated with the calculated minimum and maximum distances.

* * * * *